June 27, 1961  E. WAGNER  2,990,249
PROCESS OF PREPARING FINELY DIVIDED OXIDES BY HYDROLYSIS
Filed Oct. 9, 1958
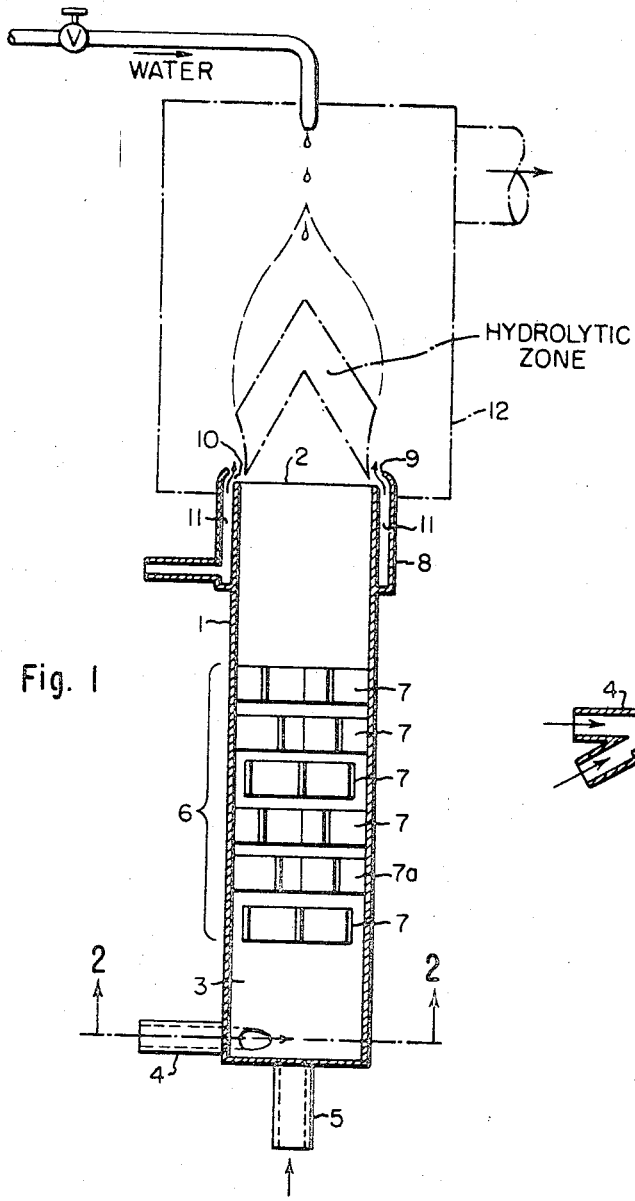
INVENTOR.
Ernst Wagner
BY
Henway, Jenney, Watts & Hildreth
Att'ys.

United States Patent Office 2,990,249
Patented June 27, 1961

2,990,249
PROCESS OF PREPARING FINELY DIVIDED OXIDES BY HYDROLYSIS
Ernst Wagner, Rheinfelden, Baden, Germany, assignor to Deutsche Gold- und Silber-Scheideanstalt vormals Roessler, Frankfurt am Main, Germany, a corporation of Germany
Filed Oct. 9, 1958, Ser. No. 766,274
5 Claims. (Cl. 23—142)

This invention comprises a novel process for the preparation of metal or metalloid oxides improved in respect to degree of fineness and surface activity as compared to such oxides heretofore available to industry. The process is characterized by the hydrolytic decomposition in a flame of suitable volatile compounds of selected elements, for example, metal halides which may be conveniently volatilized at low temperatures. This application is a continuation-in-part of application Ser. No. 344,840 filed March 26, 1953, now abandoned in favor of the present application.

The preparation of finely divided oxides, for example silicon dioxide, by combustion of the corresponding halides, has heretofore been carried on in a plurality of small flames and the silicon dioxide deposited on cooled surfaces in motion. This procedure, for large-scale production, requires extensive engineering and financial expenditure.

It has now been found that the preparation of finely divided oxides in a flame can be substantially simplified and rendered more economical by carrying on the conversion of the volatile compounds by hydrolysis in such a manner that gases forming water upon combustion, for example hydrogen or methane and oxygen, are homogeneously mixed with the volatile compound to be hydrolyzed and then caused to react together in one flame. In the process according to the invention, it is not necessary to use a large number of small flames. Instead, and contrary to expectation, perfectly uniform and extremely finely divided products are obtained when combustion is carried on in a single comparatively large flame.

The novel process of this invention has been by no means obvious. In similar processes it has heretofore been the practice to cause the reactions to proceed concurrently with combustion, e.g. with formation of solid decomposition products substantially within a preferential flame zone. This is true particularly in cases where the reaction concurrent with the combustion withdraws heat from the flame.

In attempting to overcome this disadvantage of prior processes, the volatile compound to be decomposed has been blown into a flame, or the initiation and maintenance of the decomposition reaction have been assisted or effected by means of special auxiliary flames. In practicing the prior process, silicon halide has been mixed with the combustible gases, but only with a portion of the oxygen required for the reaction. As a result of this, combustion and oxidation have taken place chiefly in the surface zones of the many small flames, where atmospheric oxygen is freely available.

It might have been anticipated that the conduct of an endothermic reaction throughout the volume of the flame would unfavorably affect the process of combustion and the concurrent decomposition. Instead, it has been found that when homogeneous mixtures are used, the decomposition of the volatile metals or metalloid halides and the formation of the corresponding oxides proceed uniformly and smoothly in nearly quantitative yield. It has been found especially advantageous to use initial mixtures having an oxygen content in at least stoichiometric proportion to the content of hydrogen or hydrogen-supplying gas required for the formation of water. In contradistinction to the conventional procedure, a flame is used which is self-sufficient with respect to the surroundings. Even when a stoichiometric mixture, associated with maximum heat concentration in the flame, is used, it is possible, contrary to expectation, to prevent any undesired coarsening of particles in the relatively large flames used according to the present process.

Very finely divided oxides are obtained if the compound to be hydrolyzed occurs in the gaseous mixture in as high a dilution as feasible. Thus, according to the invention, by altering the content of the gaseous mixture to be burned, the particle size of the oxides formed can be controlled by this simple means. The use of this expedient leads to a concurrent change in the output of metal oxide. However, even at constant output, a more finely divided product can be obtained by supplying the oxygen or oxygen-bearing component in the gaseous mixture, to the flame in a hyperstoichiometric proportion with respect to formation of water. Use of stoichiometric or hyperstoichiometric oxygen contents, in contradistinction to previously known processes, affords optimum utilization of the hydrogen or hydrogen-supplying component used. In this way, by the process of the present invention, the consumption of hydrogen can be reduced to such an extent as only slightly to exceed, for example by 10%, the amount theoretically required.

For the preparation of oxides having extraordinary surface activity it has been found advantageous to keep the temperature of the flame as low as possible, using flame temperatures between 900 and 1200° C., especially favorable results being obtained when the flame temperature is between 1000 and 1100° C. A low flame temperature may be maintained, according to the invention, by various means. The content of the gaseous halide mixture in the compound to be hydrolyzed may be raised, thereby withdrawing larger quantities of heat from the flame by the decomposition of this compound. This is done at the cost of an increased particle size. On the other hand, reduction of flame temperature may also be effected by supplying the flame with oxygen in hyperstoichiometric amounts with respect to water formation, or with inert gases as diluents, for example nitrogen. The use of the last-mentioned expedient at the same time implies a reduction in the content of the mixture with respect to the compound to be decomposed, and hence a reduction in the particle size of the oxide formed. The control means afforded by the application of these various expedients render the process according to the invention exceedingly flexible in practice, and are of substantial advantage particularly with respect to the controllable selection of a variety of products.

Reduction of flame temperature as a step tending to preserve the active surface of primary particles is subject to the limitation that, if the flame is too cool, its continuity is jeopardized. According to the invention, therefore, the process may alternatively be so conducted that the decomposition may take place in a hot flame, while the exposure time of the products is rendered extremely small. For this reason the invention contemplates the employment of short flames of great volume and small height. Such flames, if circular in shape, may for example be characterized by a ratio of height to diameter of 2:1 or 1:1 and below. In order to produce such flames, use may advantageously be made of a rosette burner in which a plurality of small flames merge into one large and comparatively short flame.

Since, according to a preferred manner of carrying out the invention, the flame is self-sufficient with respect to oxygen, i.e. includes its own supply of oxygen in at least stoichiometric amounts, the process does not require the uncontrolled supply of oxygen from the atmosphere to the flame front in order to sustain the flame and carry on the decomposition reaction. It is consequently possible to carry on the reaction in an enclosed space, thus avoiding further dilution of the oxide formed, as well as of the other reaction products, through the uncontrolled entry of air. Therefore the oxide, as well as the hydrogen chloride formed by the hydrolysis, is obtained in pure condition and in maximum concentration, so that the recovery of these products is greatly simplified and can be accomplished with a minimum of equipment.

In view of the substantially uniform and homogeneous distribution of the various reagents throughout practically the entire volume of the flame the penetration of air or oxygen-bearing gas over and above the amounts supplied in the mixture is in fact undesirable, since this may readily produce disturbances of the homogeneity of the flame, as turbulence, vertices or the like. It is therefore important to provide for laminar flow of the original gaseous or vaporous mixture on the way to the flame and within the latter.

In order to obtain oxides of high surface activity in which the distortions and active centers on the surface of the primary particles are largely to be preserved, it is not necessary, according to another phase of the present invention, to confine oneself to the use of low flame temperatures or short exposure times. I have discovered that in hot and/or comparatively long flames, oxides having especially advantageous properties may be obtained when the particles formed in the flame are quenched by the injection of water into the top of the flame, as close as possible to the end of the hydrolytic zone. In order to obtain a favorable and uniform action throughout the cross section of the flame, it is desirable to use liquid water in droplets of various sizes, the droplets penetrating farther into the interior of the flame, the greater their mass. The injection of a limited quantity of droplets into the top of the flame does not extinguish the flame but has been found effective to obviate or diminish an undesired growth of the grain size.

In order to maintain the desirable properties of the oxide particles formed, with respect to fineness and surface condition, until deposition or ultimate recovery of the solid reaction products, it has been found highly advantageous to allow as complete a conversion as possible to take place in the presence of previously formed oxide particles. The particles first precipitated from the aerosol state thus act more or less as inoculants or nuclei of condensation for the further precipitation of as yet unformed particles, if held in suspension over as long a path as possible. Coagulation is further favored by motion of the particles, especially relative to each other. According to the invention, the stream of gas containing the aerosol is revolved in large chambers or passed through long suitably curved tubes in such a manner that a turbulent flow is established and the suspended particles remain for some time. The final separation of the solid and gaseous reaction products may then be effected by conventional cyclone separators. However, filters or electric precipitators may also be used. An advantage of my novel process is that cyclones may be used alone.

An essential factor in the successful practicing of the process is the use of suitably designed burners, of a construction such as to lend themselves to the basic requirements of the invention. It is especially important that the mixture of the compound to be decomposed and the gases forming the water for hydrolysis be intimate and homogeneous, and supplied to the flame in a uniform, smooth and laminar flow. For practicing the present process the most suitable burners are those which, in addition to a mixing chamber for the gases taking part in the reaction, are provided with devices in which the flow of gas can be directed and rectified. Also, the burners should be provided with means by which the mouth of the burner is reliably kept free from deposits, "streamers," etc.

The burner herein disclosed is the subject matter of my copending application Serial No. 689,427 filed October 10, 1957 as a continuation-in-part of application Serial No. 344,840 filed March 26, 1953.

These and other features of the invention will be best understood and appreciated from the following detailed description taken with the accompanying drawings, in which:

FIG. 1 is a view showing a burner tube of preferred type and its connections in longitudinal section, FIG. 2 is a view in cross section in the line 2—2 of FIG. 1, and FIG. 3 is a view in perspective of a single baffle.

In FIG. 1, 1 is the burner tube proper, while the mouth of the burner is at 2. At the end of the tube away from the flame, we have the mixing chamber 3 with inlets 4 and 5 for the reagents. In order to secure homogeneous mixture of the components in the mixing chamber 3, the entering gases or vapors are vigorously agitated by tangential entry of at least one of the components into the chamber, while the other enters at an angle. The inlet 4 enters tangentially and the inlet 5 enters axially. Between the mixing chamber and the flame, a considerable portion of the tube is occupied by baffles 7 and forms a flow-rectifying chamber 6.

The arrangement of these baffles 7 is shown in the sectional view of FIG. 2 and in FIG. 3. Each baffle comprises three sheets or plates superficially extended in the direction of gas flow and intersecting in the axis of the burner tube from which they diverge. The sheets thus form a star-shaped unit and each of these baffle units is radially shifted around the axis of the burner relative to the unit above it as indicated in FIG. 2 by the dotted line 7a.

In FIG. 2 the gas inlet 4 is shown as being subdivided and having a branch 4a. In practice the hydrogen or hydrogen-supplying gas is introduced by the inlet pipe 5 into the mixing chamber at 3, while the air or an oxygen-supplying gas for combustion enters at 4, and the halide compound to be decomposed, with a conveyor gas such as air, is introduced at 4a. The tangential flow of the gases entering at 4 thoroughly mingles and homogeneously mixes them with the hydrogen-supplying component entering axially at 5. The resulting highly agitated and turbulent mixtures of gases now enters the baffles, by which it is subdivided into segments which, owing to the radial displacement of the baffles, are rectified and transformed into uniform non-turbulent and laminar flow towards the mouth of the burner, in homogeneous distribution.

According to a preferred form of burner the part of the tube 1 towards the mouth of the burner is covered with a jacket 8 constricted at its extremity 9 so as to form an annular slit 10 in combination with the mouth of the burner. The jacket 9 and the wall 1 of the tube now form an annular space 11 through which a gas such as air may be introduced, so as to emerge annularly through the slit 10 and flow uniformly over the edge of the burner. This serves not only to keep the reaction away from the mouth of the burner, thus mechanically impeding the formation of solid reaction products at the mouth, but also, by increased dilution with inert gas, depresses the rate of ignition of the mixture to such an extent that the reaction fails to occur in that area. This combined physical and mechanical feature has proved highly advantageous for ensuring trouble-free operation of the burner, and the comparatively small amounts of air or other gas locally introduced do not adversely affect the homogeneity and stability of the flame to any appreciable extent.

In FIG. 1 the burner is shown as projecting into a closed chamber 12, indicated by dot and dash lines, from which external oxygen is substantially excluded. The flame has approximately the whole cross sectional area of the burner tube and a ratio of height to diameter of about 2:1.4. The mixed gases arrive at the flame in homogeneous, laminar flow and the hydrolysis reaction takes place under the advantageous conditions above described.

In FIG. 1 the step is suggested of injecting drops of water into the flame. The drops may be delivered under pressure, vertically as shown or in a direction oblique to the flame. If the gas mixture contains sufficient oxygen for combustion the hydrolytic zone in the flame stands a short distance from the burner orifice, depending somewhat on the velocity of the outflow.

The process according to the invention offers the possibility, with a minimum of equipment, of handling large quantities in the manufacture of finely divided surface-active oxides of metals or metalloids in yields of 98% or over, referred to the compound containing the metal or metalloid. These excellent results are obtained with maximum economy of hydrogen or hydrogen-supplying gas, with resulting surprisingly low total consumption of this gas. It has been found especially desirable to control the size and surface activity of the oxide particles produced in the many possible ways, thus making possible an optimum adaptation of the properties of the product to the specific purpose intended at the time.

Finely divided active oxides of silicon, aluminum, zinc, titanium and the like prepared by the process according to the invention have been found especially satisfactory as fillers for natural and synthetic rubber, plastics and other molding compounds, as thickeners for liquids, as sedimentation inhibitors, as catalyst vehicles, as adsorption agents, and as thickeners, bases or active vehicles for ointments, creams, powders and other cosmetic and pharmaceutical products.

*Example 1*

A mixture of about 20 cubic meters of hydrogen and of about 150 cubic meters of air is passed into a burner of the aforementioned type with an orifice of a diameter of 40 mm. In addition to this mixture 48 kilograms of a silicon tetrachloride vapor are further introduced into the burner. That means a charge of 635 grams of $SiCl_4$ per cubic meter of the air-hydrogen gas mixture. A yield of 16.6 kilograms $SiO_2$ per hour was obtained. The bulk density was about 25 grams per liter and the average particle size about 10–30 millimicrons.

*Example 2*

A quantity of about 19 cubic meters of towngas mixed with 66 cubic meters of air and charged with about 23 kilograms of $SiCl_4$ vapor is passed into a burner with an orifice with a diameter of about 12 millimeters yield of 8 kilograms of $SiO_2$ per hour was obtained with a bulk density of about 30 grams per liter. The average particle size was about 5–25 millimicrons.

*Example 3*

A mixture of 15 cubic meters of hydrogen and 38 cubic meters of air, loaded with 26 kilograms of vaporized aluminum chloride are hourly passed into a burner with an orifice of 36 millimeters diameter. It results in a yield of 9.8 kilograms of $Al_2O_3$ per hour. The product has a bulk density of 20 grams per liter and an average particle size of 5–20 millimicrons.

Substantially the same desirable results have been secured by employing the easily volatilizable chlorides of zinc or titanium in place of $SiCl_4$ or $AlCl_3$ in the examples set forth above. In all cases crystallization is carried out under conditions which force the solid oxide to separate but, owing to lack of time without crystallographic orientation, amorphous or partially amorphous products are formed having a higher surface activity than that of slowly crystallized products. The oxides produced by the process of this invention have immense surface activity, being able to form compounds with numerous substances by means of their active centers, quite contrary to the corresponding inactive oxides of commerce.

Having thus disclosed my invention and described in detail illustrative examples of its practice, I claim as new and desire to secure by Letters Patent:

1. The process of preparing finely divided oxides of metals and metalloids selected from the group consisting of aluminum, zinc, titanium and silicon by hydrolysis of volatile hydrolyzable chlorine compounds thereof, characterized by the steps of turbulently and homogeneously premixing in an enclosed space gases producing water upon combustion together with the volatile chloride to be hydrolyzed, passing the gaseous mixture in laminar flow through a burner, and causing the component gases to react in common in a flame issuing from the burner.

2. The process defined in claim 1 in which the gases premixed in the enclosed space include oxygen and hydrogen-supplying gases in at least stoichiometric proportions for the formation of water whereby combustion of the flame is supported without external oxygen.

3. The process defined in claim 1 in which the flame is burned in an enclosed space thus obtaining the oxide in maximum concentration and avoiding dilution through the controlled entry of air to the flame.

4. The process of preparing finely divided oxides of metals and metalloids selected from the group consisting of aluminum, zinc, titanium and silicon by hydrolysis of volatile hydrolyzable chlorine compounds thereof, characterized by the steps of preforming a homogeneous and combustible turbulent mixture of (1) hydrogen-supplying gas, (2) oxygen and (3) the volatile chloride to be hydrolyzed, conducting the mixture through a flow-rectifying path, burning the rectified mixture in laminar flow, and injecting drops of water into the flame thus formed and thereby quenching the oxide particles formed in the flame.

5. The process of preparing finely divided oxides from volatile hydrolyzable chlorides of metals and metalloids selected from the group consisting of aluminum, zinc, titanium and silicon, characterized by the steps of first forming a turbulent and homogeneous combustible mixture of (1) hydrogen-supplying gas, (2) oxygen and (3) the volatile chloride to be hydrolyzed, conducting the homogeneous mixture through a flow-rectifying path and thereby imparting to it a smooth laminar flow, burning the rectified mixture in a flame having a ratio of height to diameter of 2:1 to 1:1 and a flame temperature between 1000° and 1100° C. and collecting the oxide particles thus formed in the flame.

References Cited in the file of this patent

UNITED STATES PATENTS

| | | |
|---|---|---|
| 2,614,906 | Spialter et al. | Oct. 21, 1952 |
| 2,798,792 | Stelling et al. | July 9, 1957 |

OTHER REFERENCES

F.I.A.T. Final Report 743 (PB22624), Office of Military Govt. of Germany, Apr. 1946.

Bibliography of Scientific and Industrial Reports, Office of Tech. Services, U.S. Dept. of Commerce, vol. 1, No. 21, page 1218, May 31, 1946.